(12) United States Patent
Fett

(10) Patent No.: US 6,533,699 B1
(45) Date of Patent: Mar. 18, 2003

(54) DIFFERENTIAL TRANSMISSION DEVICE IN PARTICULAR FOR A MOTOR VEHICLE

(75) Inventor: Gregory A. Fett, Fort Wayne, IN (US)

(73) Assignee: Torque-Traction Technologies, Inc., Holland, OH (US)

( * ) Notice: Subject to any disclaimer, the term of this patent is extended or adjusted under 35 U.S.C. 154(b) by 0 days.

(21) Appl. No.: 09/883,958

(22) Filed: Jun. 20, 2001

(51) Int. Cl.⁷ .............................................. F16H 48/22
(52) U.S. Cl. ...................................... 475/231; 475/239
(58) Field of Search ................................ 475/231, 237, 475/238, 239, 249, 250; 192/70.2

(56) References Cited

U.S. PATENT DOCUMENTS

| | | | |
|---|---|---|---|
| 1,979,414 A | | 11/1934 | Smith .......................... 475/239 |
| 2,424,942 A | * | 7/1947 | Mynssen ..................... 475/231 |
| 3,400,610 A | | 9/1968 | Taylor et al. |
| 4,263,824 A | | 4/1981 | Mueller |
| 4,805,486 A | | 2/1989 | Hagiwara et al. |
| 4,836,051 A | | 6/1989 | Guimbretie et al. |
| 4,895,236 A | | 1/1990 | Sakakibara et al. |
| 5,041,069 A | * | 8/1991 | Horst .......................... 475/231 |
| 5,145,470 A | * | 9/1992 | Hagiwara .................... 475/231 |
| 5,172,787 A | * | 12/1992 | Kobayashi ................... 475/231 |
| 5,312,307 A | * | 5/1994 | Reaser ......................... 475/238 |
| 5,350,340 A | * | 9/1994 | Paul et al. ................... 475/238 |
| 5,531,653 A | | 7/1996 | Barnholt ..................... 475/234 |

* cited by examiner

*Primary Examiner*—Sherry Estremsky
(74) *Attorney, Agent, or Firm*—Liniak, Berenato & White

(57) ABSTRACT

A differential mechanism includes a clutch pack disposed outside said differential case and has a first set of clutch plates splined onto one of said axle shafts and a second set of clutch plates splined onto a housing sleeve, wherein the housing sleeve circumscribes said axle shaft. A control mechanism comprising an actuator actuates the clutch pack. The housing sleeve is splined to a trunnion portion of the differential case. This device simplifies and reduces the cost of the original assembly and/or the optional mounting of a controlling or limiting device associated with a differential mechanism whose output elements are connected to coaxial wheel shafts.

19 Claims, 1 Drawing Sheet

DIFFERENTIAL TRANSMISSION DEVICE IN PARTICULAR FOR A MOTOR VEHICLE

BACKGROUND OF THE INVENTION

1. Field of the Invention

The present invention relates to transmission devices for use on motor vehicles. More precisely, this invention concerns a device comprising a differential associated with a control device and/or a device for limiting the differential rotation between the two output shafts of the differential, whereby the limiting device is disposed outside of the differential case.

2. Description of the Prior Art

In the various known arrangements, irrespective of the type of the limiting or controlling device, the differential limiting device is incorporated in the differential mechanism and is located between the bearings or rolling bearings which support and stabilize the whole of the differential. This arrangement requires the manufacture of different component parts depending on whether the transmission is equipped or not with a controlling or limiting device and also results in a modification of the environment of the differential depending again on whether the transmission includes or not this controlling or limiting device. This results in a relatively high cost both for the equipment of new vehicles comprising this option and for the conversion of existing vehicles.

Some prior art devices provide a differential limiting device outside the differential case and outboard of the bearing rotatably supporting the differential case within the carrier. However, the known devices fail to provide a convenient and economical packaging arrangement for the differential limiting device and the control mechanism that controls the operation of the limiting device.

The need exists for a convenient and economic differential assembly and packaging arrangement in which the slip limiting device is disposed outside of the differential case and outside of the differential carrier.

SUMMARY OF THE INVENTION

The object of the invention is to propose an arrangement which overcomes the various drawbacks of the prior art and equips a transmission with a controlling or limiting device in a particularly economical manner which takes up a small amount of space.

For this purpose, the invention provides a transmission device comprising a differential mechanism includes a clutch pack disposed outside of the differential case. A first set of clutch plates is splined onto one of the axle shafts and a second set of clutch plates is splined onto a housing sleeve, wherein the housing sleeve circumscribes the axle shaft. A control mechanism comprising an actuator actuates the clutch pack. The housing sleeve is splined to a trunnion portion of the differential case. This device simplifies and reduces the cost of the original assembly and/or the optional mounting of a controlling or limiting device associated with a differential mechanism whose output elements are connected to coaxial wheel shafts.

As previously noted, the limiting device is disposed on the exterior of the differential case and outside of the bearing assemblies. According to other features of the invention the limiting device is disposed outside a zone defined by the differential case and the bearings; the input element of the differential has a lateral extension constituted by a hollow sleeve section through which extends one of the output elements, the lateral extension extending beyond the associated bearing assembly; and the output elements are shafts and one of the shafts extends through the hollow sleeve with connecting splines in the vicinity of the end trunnions of the differential case.

A convenient and economic differential assembly and packaging arrangement is provided in which the slip-limiting device is disposed outside of the differential case and outside of the differential carrier.

BRIEF DESCRIPTION OF THE DRAWINGS

The invention will be described in more detail hereinunder with reference to the accompanying drawing which is given by way of example and in which.

DETAILED DESCRIPTION OF THE PREFERRED EMBODIMENTS

Figure 1:
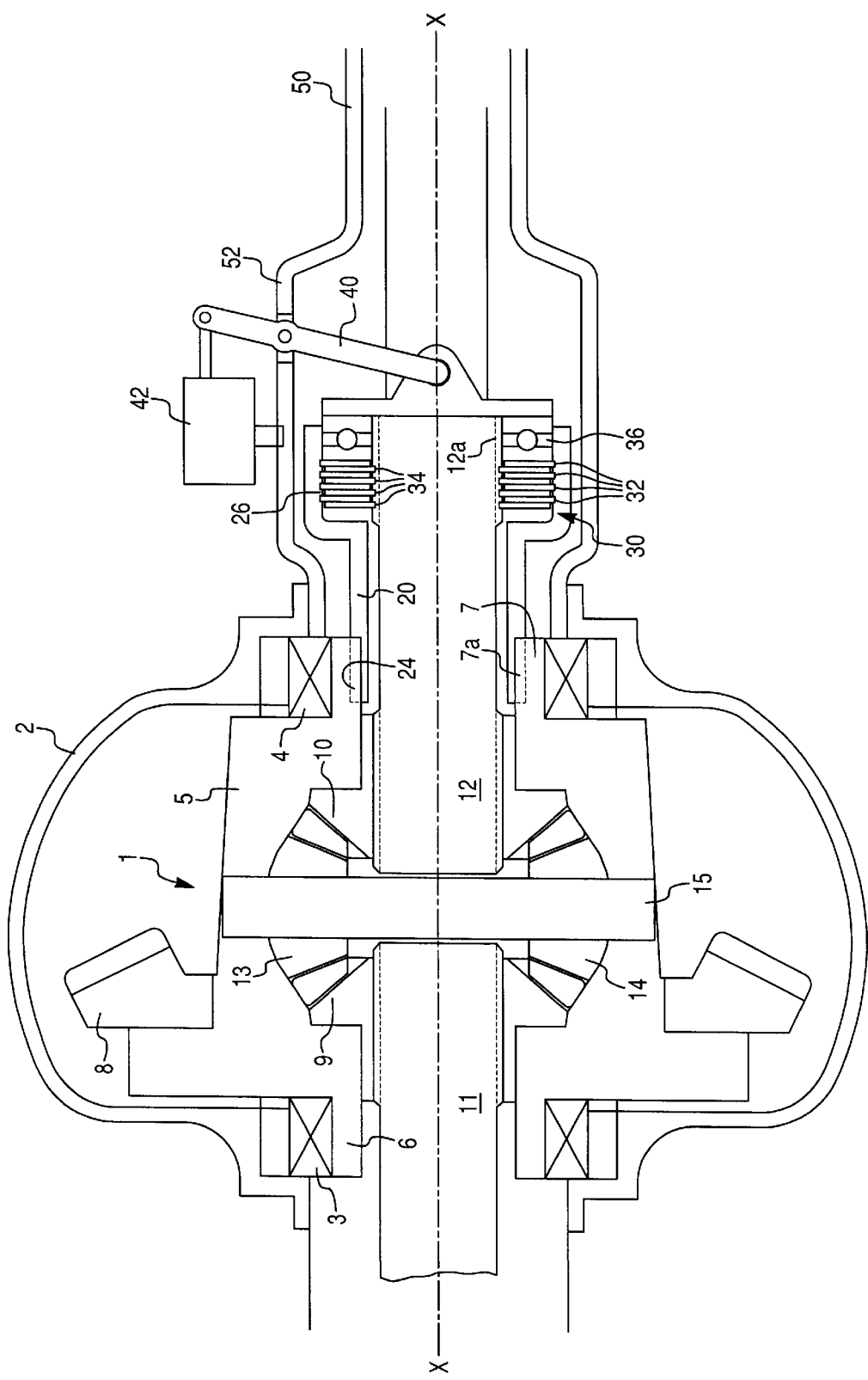
FIG. 1 is a longitudinal sectional view of a first embodiment of a device according to the invention.

FIG. 1 shows a placement diagram relative to a vehicle having a rigid rear axle. In FIG. 1, the whole of the differential 1 is supported in a fixed carrier 2 by two rolling bearings 3 and 4 having an axis X—X.

The differential comprises in the known manner a differential case 5 having two lateral extensions or trunnions 6, 7 upon which the differential case 5 is rotatively mounted through the bearings 3 and 4. The differential 1 further comprises a ring gear 8 fixedly mounted onto the differential case 5 and two side gears 9, 10 which are coaxial and centered on the same axis XX as the ring gear and the bearings 3 and 4. The two side gears 9, 10 are splined onto transmission shafts 11, 12 which extend through the housing and in the direction of the driving wheels of the vehicle. Pinion gears 13, 14 engaged with the side gears are rotatively mounted on a pinion shaft 15 carried by the differential case 5.

According to the invention, the hollow sleeve 20, which constitutes a lateral extension of the housing of the differential, extends axially beyond the rolling bearing 4 and has a radially-outwardly-facing splined end portion 24 and a radially-inwardly-facing splined end portion 26. The splined end portion 24 mates with internal splines 7a formed at the trunnion portion 7. The splined end portion 26 mates with a first series of friction discs 32.

The axle shaft 12 is also provided with a splined portion 12a disposed radially inwardly of the splined end portion 26 of the hollow sleeve 20. A second series of friction discs 34 mates with the splined portion 12a of the axle shaft 12. In the preferred embodiment, the splined portion 12a is integrally formed on the shaft 12; however, this invention should not be limited in this regard because the splined portion 12a may be separately formed and mounted onto the shaft 12.

The slip limiting device 30 therefore comprises first and second series of friction discs 32, 24 arranged in an alternating manner along the rotation axis X—X within an enlarged portion 52 of axle tube 50. An actuating lever 40 acts on the alternating frictions discs 32, 24 through thrust bearing 36 to apply a axial force along the rotation axis X—X, thereby increasing a friction force between the friction discs 32, 34. As the friction force is increased, the limiting friction between the discs 32, 34 increases to thereby limit the relative rotation of the discs 32, 34 and corresponding the relative rotation of the differential case 5 and the shaft 12.

In the preferred embodiment of this invention, an actuating motor 42 mechanically connected to the actuating lever 40, wherein the motor 42 is mounted on the enlarged portion 52 of axle tube 50.

It is noted that the specific configuration and arrangement of the slip-limiting device 30 may be varied without departing from the scope of the invention. For example, the device 30 may be actuated mechanical, electrically, magnetically, or hydraulically. Thus, by way of example a motor or solenoid valve arrangement may be employed, or a viscous-type slip-limiting device may be used.

Additionally, the design of the hollow sleeve 20 may be varied to provide a more compact arrangement or an arrangement suited to a particular differential assembly. In this regard, it is note necessary to provide the splined connection between the sleeve 20 and case 5; instead, a variety of fastening or connecting arrangements may be provided such as bolts, threads, welds or other fasteners.

In the arrangement described, the invention affords the following advantages:

the coupling means are accessible from the exterior of the differential case and the bearings supporting the differential permits the mounting as an option of a limiting or controlling device which substantially improves the operation of the differential;

due to this arrangement, the differential and its immediate environment are unchanged whether the vehicle be equipped or not with such a controlling or limiting device;

the controlling or limiting device is easily accessible, which constitutes an essential advantage in the case of an additional mounting, repairs or disassembling. This facility of access even permits an easy adaptation of the features of this device to the conditions of utilization of the vehicle.

The assembly is particularly compact since the connecting means and, as the case may be, the controlling or limiting device are disposed coaxially with the differential and the wheel shafts.

It will be understood that there may be used in the described arrangement any suitable type of controlling or limiting device having an automatic operation or a controlled and piloted operation.

Further, the differential mechanism may be of any type. It is also possible to provide means according to the invention on each side of the differential case. While the invention has been described with reference to the foregoing embodiments, various changes and modifications may be made thereto which fall within the scope of the appended claims.

What is claimed is:

1. A limited slip differential assembly comprising:
    a differential mechanism including a fixed carrier, a differential case defining an input element, and two axle shafts;
    a clutch pack disposed outside said differential case and having a first set of clutch plates splined directly onto one of said axle shafts, a second set of clutch plates splined onto a housing sleeve, wherein said housing sleeve circumscribes said axle shaft;
    a control mechanism comprising an actuator adapted to actuate said clutch pack,
    wherein said housing sleeve is fixedly connected to a trunnion portion of the differential case.

2. The limited slip differential assembly of claim 1, wherein said housing sleeve is fixedly connected to a trunnion portion of the differential case through a splined interface.

3. The limited slip differential assembly of claim 1, further comprising a pair of bearing assemblies rotatably supporting said differential case in said fixed carrier for rotation about an axially extending rotation axis, said differential mechanism being axially located between said bearing assemblies.

4. The limited slip differential assembly of claim 3, wherein said clutch pack is disposed outboard of said bearing assemblies with respect to said rotation axis.

5. The limited slip differential assembly of claim 1, wherein said control mechanism further comprises a pivoting member applying an axial force to said first and second set of clutch plates.

6. The limited slip differential assembly of claim 1, wherein said clutch pack is disposed outside of said fixed carrier.

7. A transmission device comprising:
    a differential mechanism including a fixed carrier, a differential case defining an input element, and two output elements;
    a pair of bearing assemblies rotatably supporting said differential case in said fixed carrier for rotation about an axially extending rotation axis, said differential mechanism being axially located between said bearing assemblies;
    a limiting device for limiting a differential rotation between said output elements, said limiting device including first and second rotatable parts rotatable relative to each other and adapted to be coupled together by first and second series of alternating friction discs;
    an actuator applying an axial force to said first and second series of alternating friction discs to limit said differential rotation; and
    connecting sleeve coupling said differential case to one of said first and second rotatable parts of said limiting device, said connecting sleeve extending axially from said differential case to said limiting device to thereby directly connect said first series of friction discs with said differential case,
    wherein said first set of friction discs is directly splined onto an interior circumferential splined portion of said connecting sleeve.

8. The device of claim 7, wherein said connecting sleeve rotatably couples said differential case to one of said first and second rotatable parts of said limiting device through splines disposed on a splined end portion of said connecting sleeve.

9. The device of claim 7, wherein said limiting device is disposed outside of said differential case with respect to said rotation axis.

10. The device of claim 7, wherein said limiting device is disposed outside of said fixed carrier with respect to said rotation axis.

11. The device of claim 7, wherein a splined end portion of said connecting sleeve defines one of said first and second rotatable parts of said limiting device.

12. The device of claim 11, wherein said first series of alternating friction discs is splined onto said connecting sleeve.

13. The device of claim 7, wherein said two output elements are defined by first and second axle shafts.

14. The device of claim 13, wherein said first axle shaft defines one of said first and second rotatable parts.

15. The device of claim 13, wherein said second series of alternating friction discs is splined onto said first axle shaft.

16. The device of claim 7, wherein said limiting device is disposed between said connecting sleeve and one of said output elements.

17. The device of claim 7, wherein said limiting device is coaxially mounted about one of said output elements.

18. The device of claim 7, wherein said first rotatable part is a splined end portion of said connecting sleeve and said second rotatable part is a external splined portion of an axle shaft.

19. The device of claim 7, wherein the actuator applying an axial force to said first and second series of alternating friction discs through a thrust bearing, and wherein one set of said friction discs is splined directly onto one of said output elements.

* * * * *